United States Patent
Dharmadhikari et al.

(10) Patent No.: US 12,238,574 B1
(45) Date of Patent: Feb. 25, 2025

(54) WIRELESS ACCESS POINT ENHANCEMENTS FOR SESSION TRANSFER, MIRRORING, AND MOBILITY

(71) Applicant: CABLE TELEVISION LABORATORIES, INC., Louisville, CO (US)

(72) Inventors: Omkar Shripad Dharmadhikari, Broomfield, CO (US); John C. Bahr, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/590,624

(22) Filed: Feb. 1, 2022

Related U.S. Application Data

(62) Division of application No. 16/569,432, filed on Sep. 12, 2019, now abandoned.

(60) Provisional application No. 62/732,116, filed on Sep. 17, 2018, provisional application No. 62/731,172, filed on Sep. 14, 2018.

(51) Int. Cl.
| | |
|---|---|
| *H04W 28/06* | (2009.01) |
| *H04W 8/08* | (2009.01) |
| *H04W 36/00* | (2009.01) |
| *H04W 64/00* | (2009.01) |
| *H04W 80/10* | (2009.01) |

(52) U.S. Cl.
CPC .............. *H04W 28/06* (2013.01); *H04W 8/08* (2013.01); *H04W 36/0019* (2023.05); *H04W 64/006* (2013.01); *H04W 80/10* (2013.01)

(58) Field of Classification Search
CPC .... H04N 21/6125; H04W 8/08; H04W 28/06; H04W 36/0011; H04W 64/006; H04W 80/10; H04W 84/12; H04W 88/08; H04L 65/613
See application file for complete search history.

(56) References Cited

U.S. PATENT DOCUMENTS

| | | | |
|---|---|---|---|
| 7,573,857 B1 | 8/2009 | Radhakrishnan et al. | |
| 2013/0308470 A1 | 11/2013 | Bevan et al. | |
| 2014/0164558 A1* | 6/2014 | Moon ................... | H04W 28/02 709/217 |
| 2014/0171064 A1* | 6/2014 | Das ....................... | H04W 84/18 455/426.1 |
| 2014/0302852 A1 | 10/2014 | Ostergaard et al. | |

(Continued)

*Primary Examiner* — Pao Sinkantarakorn
(74) *Attorney, Agent, or Firm* — Cozen O'Connor

(57) ABSTRACT

Systems and methods enhance handling, within an access point (AP) of a local area network, of content from a content provider. A content session core of the AP opens a session with the content provider and allows interaction between a user of a first end device and the content provider via the session. Content from the content provider is received at the content session core and forwarded for play on the first end device. The content session core may mirror the content to a second real end device without requiring an additional session with the content provider, and may switch play of the content from the first to the second end devices without disconnecting the session with the content provider. A wireless LAN controller enhances a connectivity experience of a mobile device by determining its location and predicting when to handoff connectivity between wireless APs of the LAN.

21 Claims, 7 Drawing Sheets

(56) References Cited

U.S. PATENT DOCUMENTS

| | | | |
|---|---|---|---|
| 2015/0004974 A1 | 1/2015 | Karimi-Cherkandi et al. | |
| 2015/0199122 A1* | 7/2015 | Garmark | H04L 65/1089 |
| | | | 715/716 |
| 2017/0324988 A1* | 11/2017 | Fan | H04N 21/431 |
| 2018/0270319 A1* | 9/2018 | Ogura | H04W 28/26 |
| 2019/0150043 A1 | 5/2019 | Lundqvist et al. | |
| 2019/0182315 A1* | 6/2019 | Killian | H04L 67/306 |
| 2019/0215378 A1 | 7/2019 | Munishwar et al. | |
| 2019/0335133 A1* | 10/2019 | Sharif-Ahmadi | |
| | | | H04N 21/4325 |

\* cited by examiner

WIRELESS ACCESS POINT ENHANCEMENTS FOR SESSION TRANSFER, MIRRORING, AND MOBILITY

RELATED APPLICATIONS

This application is a Divisional Application of U.S. patent application Ser. No. 16/569,432, titled "Wireless Access Point Enhancements for Session transfer, Mirroring, and Mobility," filed Sep. 12, 2019, which claims priority to U.S. Patent Application Ser. No. 62/731,172, titled "Session Transfer and Mirroring by AP", filed Sep. 14, 2018, and to U.S. Patent Application Ser. No. 62/732,116, titled "Enhanced Wi-Fi Mobility with AI", filed Sep. 17, 2018, all of which are incorporated herein in their entireties by reference.

BACKGROUND

Versatility in playing media through a local area network (LAN, Wi-Fi, etc.) is limited. For example, two members of a family at home may wish to simultaneously watch the same movie; a first family member wishes to watch the movie on a smart TV in a living-room, and a second family member wishes to watch the same movie on a tablet computer in a bedroom. The movie is available from a subscription-based streaming service (e.g., Netflix), to which the family has a subscription; however, both the smart TV and the tablet computer must each independently establish a session (e.g., login) with the subscription-based streaming service through the LAN, then select and start playing of the same movie. The subscription-based streaming service sends two independent streams of data: one to the smart TV and the other to the tablet computer, where both streams are delivered through the same ISP connection (e.g., to the family home), and through the same LAN. As the number of devices displaying the movie increases, the used bandwidth on both the ISP connection and the LAN increases in proportion, and thus the delivery of the movie is not optimal.

Switching playing of the movie between devices is also difficult. Continuing with the above example, when, the battery of the tablet computer runs low, the second family member wishes to switch playing of the movie to their smartphone. Accordingly, the second family member must login to the subscription-based streaming service using the smartphone, find their place in the movie, and then resume playing of the movie.

Where an area has a LAN with multiple wireless access points (APs), a mobile device (e.g., a smartphone, tablet computer etc.) generally manages its own wireless connection, logging in to a nearest of the wireless APs. When moving through the area, it may need to disconnect from a first AP (e.g., its current AP) and connect to a different AP when the first AP signal becomes weak. However, a current session with a service provider may be interrupted by this disconnection and reconnection.

SUMMARY

One aspect of the present embodiments includes the realization that a significant portion of network traffic is duplicated when two end devices connected to a local area network (LAN) are viewing the same content from a content provider via a wide area network (WAN) (e.g., the Internet), since either (a) each device independently creates a session (communication path for transferring content) with the content provider via an access point (AP) (e.g., Wi-Fi) of the LAN, or (b) one end device connects to the content provider and then retransmits the received content to the second end device via the AP and LAN. The present embodiments solve this problem by including, within the AP connection to the LAN, a content session core that creates a session with a content provider to receive the content from the content provider. The content session core then forwards the content to one or more end devices. Advantageously, the content is only transferred from the content provider to the AP once, and is then transferred from the AP, via the LAN, to each receiving end device. This avoids unnecessary transmission of the content between the content provider and the AP or end devices. In certain embodiments, transfer of content from the content provider to each of the one or more end devices is synchronized (e.g., pausing play of the content pauses for all end devices). In other embodiments, the AP may buffer content from the content provider, allowing the one or more end devices to asynchronously control transfer of content from the AP to the end device (e.g., each end device may individually control playback of the content).

Another aspect of the present embodiments includes the realization that to switch display of content by a first device to display of the content by a second device requires that the first device disconnect its current session with the content provider, the second device create a new session with the content provider, and then, to resume playback of the content at the appropriate position, control of playback to start play of the content at the appropriate position. The present embodiments solve this problem by including, within the AP, a content session core that creates a session with a content provider to receive the content. The content session core then forwards the content to a first end device for display. The user may switch display of the content from the first end device to a second end device without needing to disconnect the session with the content provider, without needing to create a new session between the content provider and the second end device, and without needing to control the content provide to start play of the content at the appropriate position (since the same session remains connected). Advantageously, switching display of content between devices is much simpler, quicker, and does not lose position within the content stream.

Another aspect of the present embodiments includes the realization that when a mobile device (may also be referred to as a station or STA) moves from a first location served by a first wireless AP (WAP) to a second location served by a second WAP, the mobile device must actively determine that it cannot remain connected to the first WAP, find the second WAP, disconnect from the first WAP, and connect to the second WAP, to maintain connectivity to a local-area network (LAN). Such expected behavior is burdensome and non-optimal for the mobile device. The present embodiments solve this problem by providing a wireless local-area network controller (WLC) that uses artificial intelligence (AI) to predict movement of the mobile device and automatically control handoff connectivity of the mobile device from a first wireless AP to a second wireless AP to maintain network connectivity for the mobile device. Advantageously, the mobile device does not need to determine when to switch between wireless APs based upon a received signal strength and is automatically disconnect from the first wireless AP and connect to the second wireless AP.

Another aspect of the present embodiments includes the realization that, in response to moving away from a first wireless AP, selecting a second wireless AP based upon received signal strength does not result is the most optimal connection when the second wireless AP is overly congested. The present embodiments solve this problem by providing a wireless local-area network controller (WLC) that uses artificial intelligence to determine the second wireless AP based upon both the movement of the mobile device and the loading of wireless APs within range of the mobile device. Advantageously, a quality of network connectivity provided to the mobile device is improved by automatically selecting the most appropriate wireless AP for receiving the handover of the mobile device based upon predicted movement of the mobile device and workload of the wireless APs available for use by the mobile device.

In one embodiment, a method enhances handling of content from a content provider within an access point. A content session core of the access point receives a first instruction to open a session with the content provider and interacts with the content provider to open the session between the content provider and the content session core. Interaction between a user of a first real end device and the content provider is allowed via the content session core and the session. The content session core receives the content from the content provider via the session, and forwards the content to the first real end device.

In another embodiment, a software product has instructions, stored on computer-readable media, wherein the instructions, when executed by processor of an access point, perform steps for enhanced handling of content from a content provider within the access point. The software includes instructions for receiving, at a content session core of the access point, a first instruction to open a session with the content provider; instructions for interacting with the content provider to open the session between the content provider and the content session core; instructions for allowing, via the content session core and the session, interaction between a user of a first real end device and the content provider; instructions for receiving, at the content session core via the session, the content from the content provider; and instructions for forwarding the content to the first real end device.

In another embodiment, a method enhances session handoff of a mobile device between wireless access points (WAPs) of a local area network (LAN) distributed over a geographic area. Locations of the mobile device connected to a first WAP of the LAN are determined at intervals. Movement of the mobile device is determined based upon the locations, and a future location of the mobile device is predicted based, at least in part, upon the movement. A second WAP of the LAN with an operational range including the future location is determined, and a predicted handoff of the mobile device from the first WAP to the second WAP at a predicted time is generated.

DETAILED DESCRIPTION OF THE EMBODIMENTS

An end device connects to a local area network (LAN) (e.g., using Wi-Fi or a wired connection) that connects to a wide area network (WAN) (e.g., the Internet) to receive content from a content provider. The end device may represent one or more of a smartphone, a laptop computer, a tablet computer, a smart television, and so on. In the prior art, the wireless end device creates a session with a content provider to receive content, via the WLAN, for display to a user. The session is thus configured between the wireless end user and the content provider, and thus the session cannot be dynamically transferred to another device. Further, the content cannot be concurrently mirrored on multiple devices without significant network overhead, since each of the multiple devices mirroring the data would need to either (a) create a session with the content provider to receive the content, or (b) receive the content, over the WLAN, from another device that has a session with the content provider.

Figure 1:
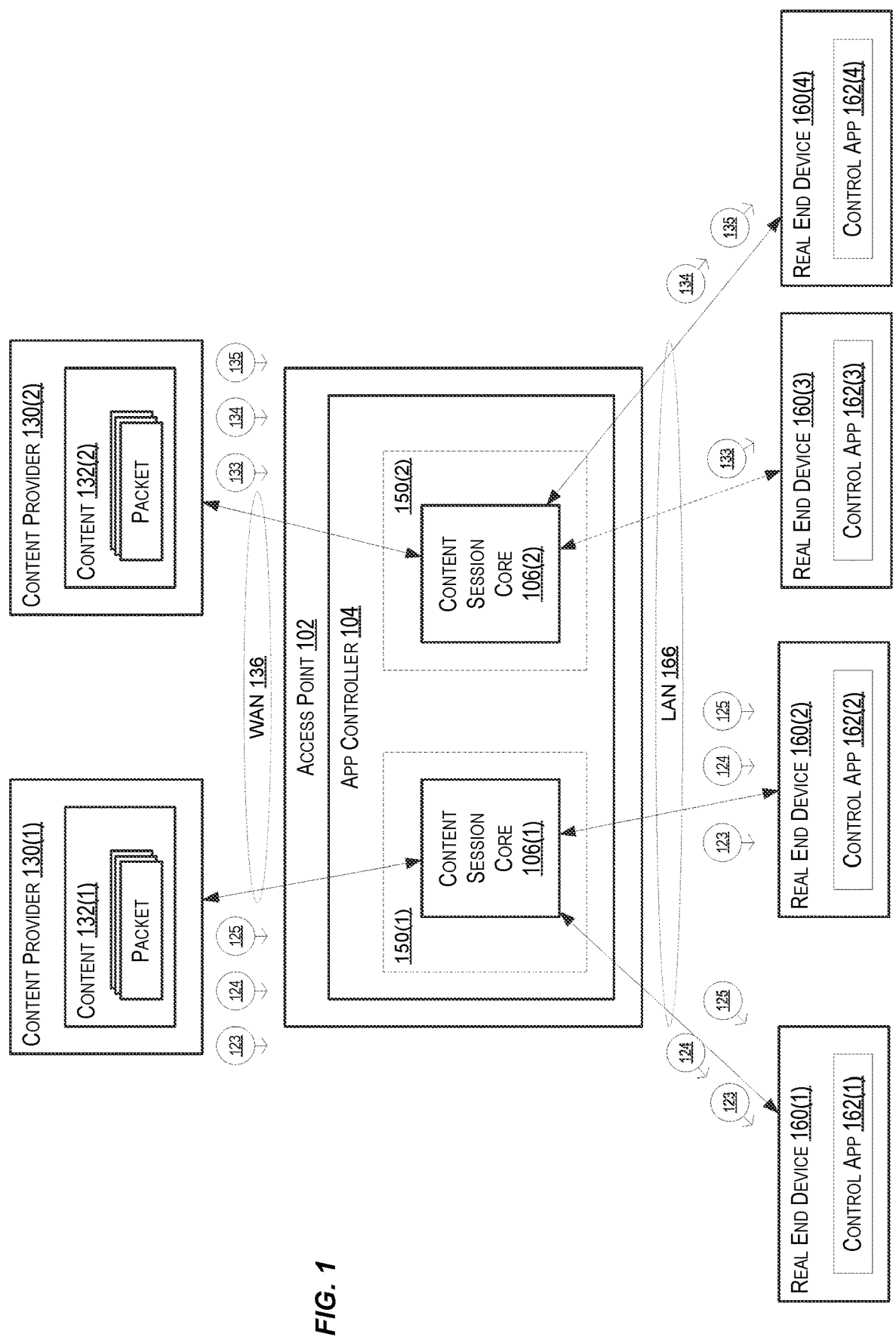
FIG. 1 is a functional diagram illustrating one example access point (AP) that is enhanced for session transfer and mirroring, in embodiments.

FIG. 1 is a functional diagram illustrating one example access point (AP) 102 that is enhanced for session transfer and mirroring. An application controller 104 of AP 102 includes at least one content session core 106 that allows AP 102 to appear as an end-device (illustratively shown in dashed line as a pseudo end device 150) to a content provider 130 and to receive content 132 from content provider 130. Content session core 106 may also interact with at least one real end device 160 to allow a user to view content 132 on real end device 160. Real end device 160 may also allow the user to control playing of the content, wherein the real end device 160 interacts with content provider 130 via content session core 106 for example. For example, content session core 106 may be specifically configured for interaction with one content provider 130 and may be downloaded and installed within application controller 104 by an end user. In certain embodiments, content session core 106 is associated with one specific content provider 130. In other embodiments, content session core 106 is generic and may be configured (e.g., though use of configuration parameters including username and password) to connect with more than one content provider 130. For example, at least one content session core 106 may be included with AP 102.

Figure 2:
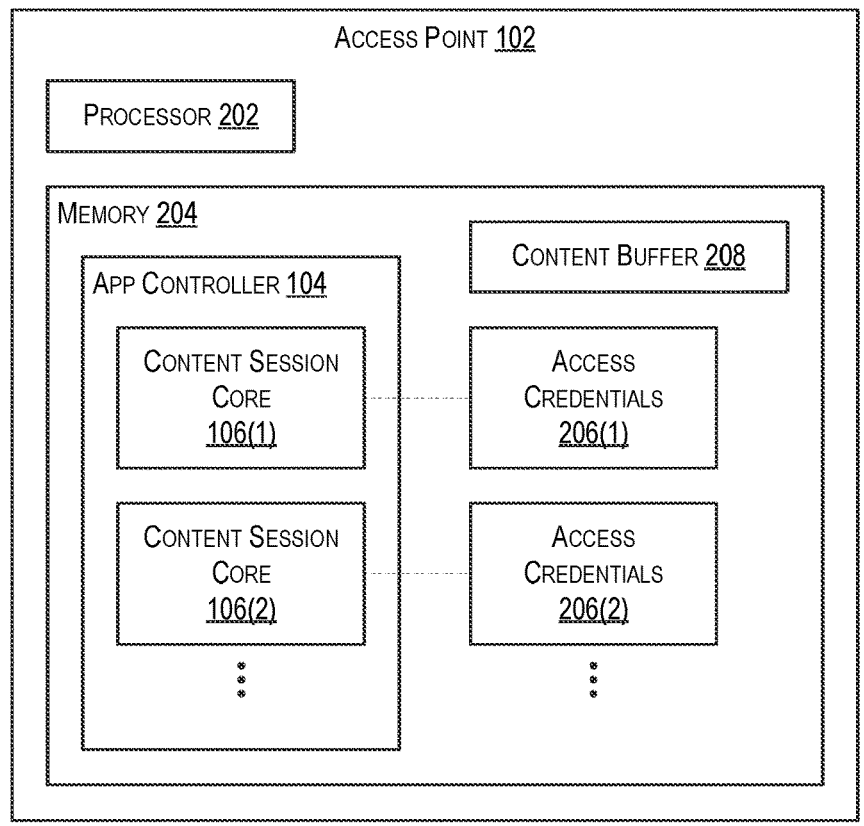
FIG. 2 functional block diagram illustrating the AP of FIG. 1 in further example detail, in embodiments.

FIG. 2 is a functional block diagram illustrating AP 102 of FIG. 1 in further example detail. FIGS. 1 and 2 are best viewed together with the following description. AP 102 may include a processor 202 communicatively coupled with memory 204. Application controller 104 is stored in memory 204 as machine readable instructions (e.g., firmware) that, when executed by processor 202, control AP 102 to implement the functionality described herein. Accordingly, content session cores 106 are also implemented as machine readable instructions executable by processor 202. Each content session core 106 may have corresponding access credentials 206 that allow content session cores 106 to login to a user's account of the corresponding content provider 130. In certain embodiments, each content session core 106 may be independently downloaded and installed into application controller 104. In other embodiments, multiple content session cores 106 may share machine readable instructions and application controller 104 runs more than one instance of content session core 106 based upon selected access credentials 206. For example, application controller 104 may generate an instance for each content session core 106 based upon access credentials 206.

In the example of FIG. 1, access credentials 206(1) of content session core 106(1) may be configured by the user, via a control application 162 (e.g., a downloadable app) running on real end device 160(1) for example, with appropriate information (e.g., web address, login username and password etc.) for connecting with content provider 130(1). The user may then interact with control application 162 to instruct content session core 106(1) to connect and interact with content provider 130(1). For example, the user may interact with content provider 130(1), via content session core 106(1), to select content 132(1) (e.g., a movie) for playing on real end device 160(1). Content provider 130(1) then sends a stream of packets (illustratively shown as packets 123, 124, and 125) of selected content 132(1) to content session core 106(1), and content session core 106(1) automatically forwards content 132(1) to real end device 160(1) for display to the user.

The user may also configure content session core 106(1), using control application 162 for example, to mirror (e.g., simultaneously display) content 132(1) on at least one second real end device 160(2), whereby content session core 106(1) simultaneously sends content 132(1) (e.g., packets 123, 124, and 125) to both real end devices 160(1) and 160(2) without requiring duplicate packets to be sent from content provider 130(1). Advantageously, irrespectively of the number of real end devices 160 mirroring content 132, data traffic between content provider 130(1) and AP 102 (e.g., over WAN 136) does not increase. For example, real end device 160(1) may represent a desktop computer that is connected to AP 102 and real end device 160(2) may represent a smart television set, whereby a movie, represented by content 132(1), is played simultaneously on both the desktop computer and the smart television using only a single session between AP 102 and content provider 130(1).

In embodiments, content session core 106 operates as a tunnel for transferring data between real end devices 160 and content providers 130 and appears transparent to real end devices 160. That is, to the user, control application 162 may appear as if it is communicating directly with content provider 130, and the user is therefore unaware that content session core 106 forms and controls the session with content provider 130. Content session core 106 operates as a pseudo end device 150 that appears as a normal real end device to content provider 130. In this scenario, AP 102 transfers content 132 synchronously to each real end device 160, whereby any one of the real end devices may control (e.g., pause, rewind, play, etc.) playing of the content on all selected real end devices. In alternative embodiments, AP 102 may implement a content buffer 208 that may be used by one or more content session cores 106 to buffer at least part of content 132 such that real end devices 160 may individually control (e.g., using control app 162) playing of content 132, wherein content 132 may be transferred from content buffer 208 to each real end device 160 asynchronously when so controlled. For example, AP 102 may operate like a digital video recorder to allow each of the real end devices 160(1) and 160(2) independent control over playback of content 132.

Although content provider 130(1) is interacting with a single pseudo end device 150(1), content session core 106 (1) may provide information of real end devices 160(1) and 160(2), such that content provider 130(1) is aware of (e.g., and may charge for) actual display of content 132(1). That is, content provider 130 need not be disadvantaged by content session core 106.

In the prior art, when a user wishes to switch play of content from a first end device to a second end device, the first end device disconnects its session with a content provider and the second end device establishes a new session with the content provider. Since the content provider handles each session independently, the new session established by the second end device is unaware of the state (e.g., a current playback position) of the first session (unless the content provider specifically records status of a session for a user account when disconnecting and allows a new session for that user account to resume playback where the previous session stopped). Content session core 106 simplifies switching of playback of content 132 between two real end devices 160.

FIG. 1 illustrates a second example scenario where a content session core 106(2) emulates a pseudo end device 150(2) within AP 102 to allow a user, via a control application 162(3) running on real end device 160(3), to switch play of streamed content 132(2) from real end device 160(3) to real end device 160(4). Content session core 106(2) uses access credentials 206(2) to connect with content provider 130(2), and the user of real end device 160(3) may direct, using control application 162(3) and via content session core 106(2), content provider 132(2) to provide content 132(2). Accordingly, content provider 130(2) sends content 132(2) to content session core 106(2), and content session core 106(2) forwards content 132(2) to real end device 160(3) where it is displayed to the user, for example.

In this example, part way through display of content 132(2) on real end device 160(3), the user decides to switch playing of content 132(2) to real end device 160(4). Content 132(2) is shown as a stream of consecutive packets 133, 134, and 135, and the user decides to switch devices between packets 133 and 134. The user, interacting with control application 162(3), instructs content session core 106(2) to switch play of content 132(2) from real end device 160(3) to real end device 160(4). Real end device 160(4) is already connected to AP 102 and the user may select real end device 160(4) from a list (e.g., AP 102 maintains this list) of connected real end devices 160 displayed by control application 162(3). Accordingly, the user may select real end device 160(4) from the list and content session core 106(2) may stop forwarding content 132(2) to real end device 160(3) and immediately start forwarding (e.g., with packet 134) content 132(2) to real end device 160(4).

In certain embodiments, when the user instructs content session core 106(2) to switch play of content 132(2) from real end device 160(3) to real end device 160(4), content session core 106(2) may instruct content provider 130(2) to pause streaming of content 132(2) until the user resumes (un-pauses) play on real end device 160(4).

Since content session core 106(2) appears as pseudo end device 150(2) to content provider 130(2), content provider 130(2) may be unaware that content 132(2) has been switched from real end device 160(3) to real end device 160(4). However, in certain embodiments, where real end devices 160(3) and 160(4) have different format displays, content session core 106(2) may instruct content provider 130(2) to resume streaming of content 132(2) in a different format (e.g., at a different rate and/or size). Advantageously, since the session between content session core 106(2) and content provider 130(2) is not disconnected, no new session is opened with content provider 130(2) and the current position of play of content 132(2) is maintained without special handling by content provider 130(2).

Although these examples use media stream, content session core 106 may allow transfer of data in both downlink (e.g., from content provider 130 to real end device 160) and uplink (e.g., from real end device 160 to content provider 130) directions. Content provider 130 may represent any type of content provider, such as one or more of a movie provider (e.g., Netflix, Hulu, Amazon Prime, etc.), a voice-over-Internet (VoIP) server, a video communication service (e.g., Facetime) and so on.

In one example of operation, a VoIP server receives a call to a VoIP account of a user. Within AP 102, a content session core 106 may be configured with access credentials 206 of the user's VoIP account, wherein content session core 106 is logged into the VoIP server using the VoIP account of the user. Accordingly, the VoIP server notifies content session core 106 of the call, and content session core 106 indicates the incoming call to one or more of real end devices 160 (e.g., the VoIP call "rings" on the real end devices). In certain embodiments, each of the real end device 160 may also be signed-in to the VoIP server using the VoIP account of the user). When the user answers the call on one of real end devices 160, content session core 106 opens a VoIP session with the VoIP server (e.g., similar to opening a session with content provider 130) to enable the call to proceed through real end device 160. Advantageously, the user may move the VoIP call to any other real end device 160, similarly to switching real end devices described above, without the VoIP session being dropped, since the session is maintained between content session core 106 and the VoIP server. Similarly, an outgoing VoIP call may be routed from one real end device 160, via the corresponding content session core 106, to the VoIP server, where content session core 106 generates a session with the VoIP server to initiate the call. Advantageously, the user may switch the VoIP call between real end devices 160 without the session between content session core 106 and the VoIP server being dropped.

In certain embodiments, content session cores 106 may use an IP address of AP 102 when interacting with WAN 136 and to route the network traffic to real end devices 160. This allow content session cores 106 to transfer an active session (e.g., a connection to content provider 130) from one real end device 160 to another without the content provider 130 requiring any change in routing of packets of content 132. Similarly, use of the IP address of AP 102 allows content session cores 106 to mirror the network traffic to any number of connected real end devices 160.

Figure 3:
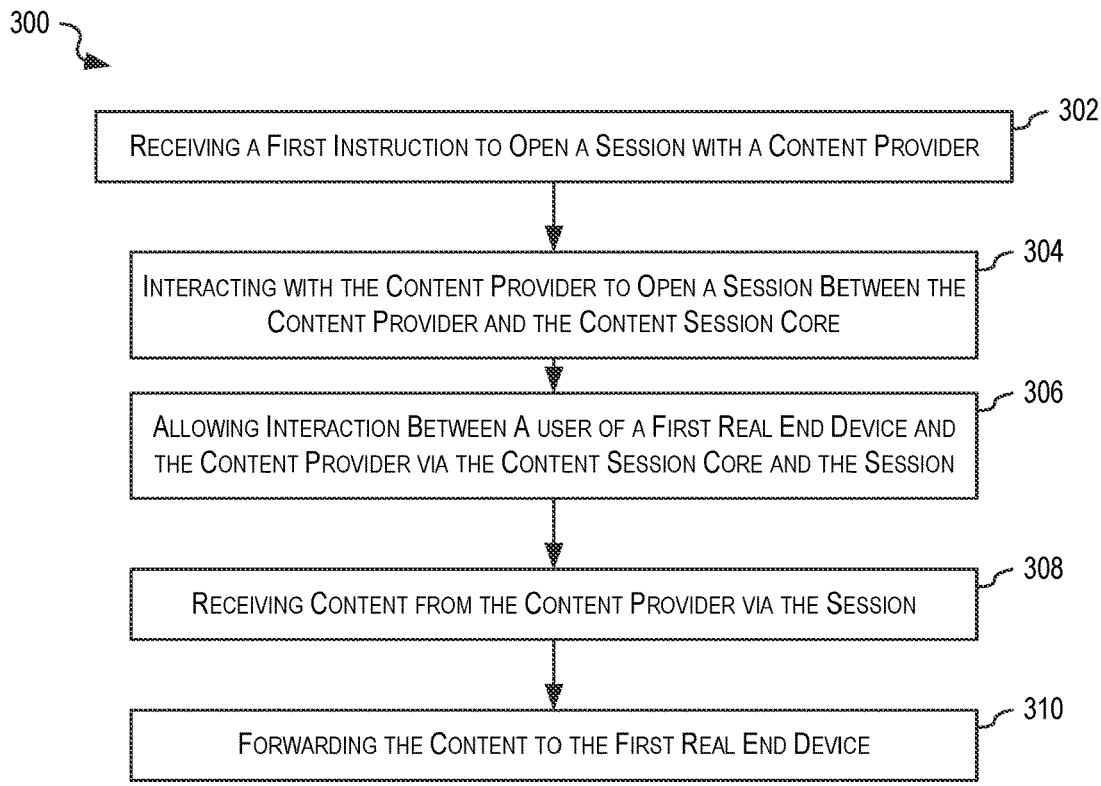
FIG. 3 is a flowchart illustrating one example method for session transfer in an access point of a local-area network, in embodiments.

FIG. 3 is a flowchart illustrating one example method 300 for session transfer in an access point of a local-area network. Method 300 is implemented in content session core 106 of application controller 104, for example. In block 302, method 300 receives a first instruction to open a session with a content provider. In one example of block 302, content session core 106(1) of AP 102 receives an instruction from a user, via control application 162(1), to open a session with content provider 130(1). In block 304, method 300 interacts with the content provider to open a session between the content provider and the access point. In one example of block 304, content session core 106(1) uses access credentials 206(1) to login to a user account of content provider 130(1) and open a session between content provider 130(1) and content session core 106(1). In block 306, method 300 allows, via the content session core and the session, interaction between a user of a first real end device and the content provider. In one example of block 306, content session core 106(1) allows the user of real end device 160(1) to interact with content provider 130(1). In block 308, method 300 receives, at the content session core via the session, content from the content provider. In one example of block 308, content session core 106(1) receives content 132(1) from content provider 130(1) via the session established in block 304. In block 310, method 300 forwards the content to the first real end device. In one example of block 310, content session core 106(1) forwards content 132(1), received from content provider 130(1), to real end device 160(1).

Figure 4:
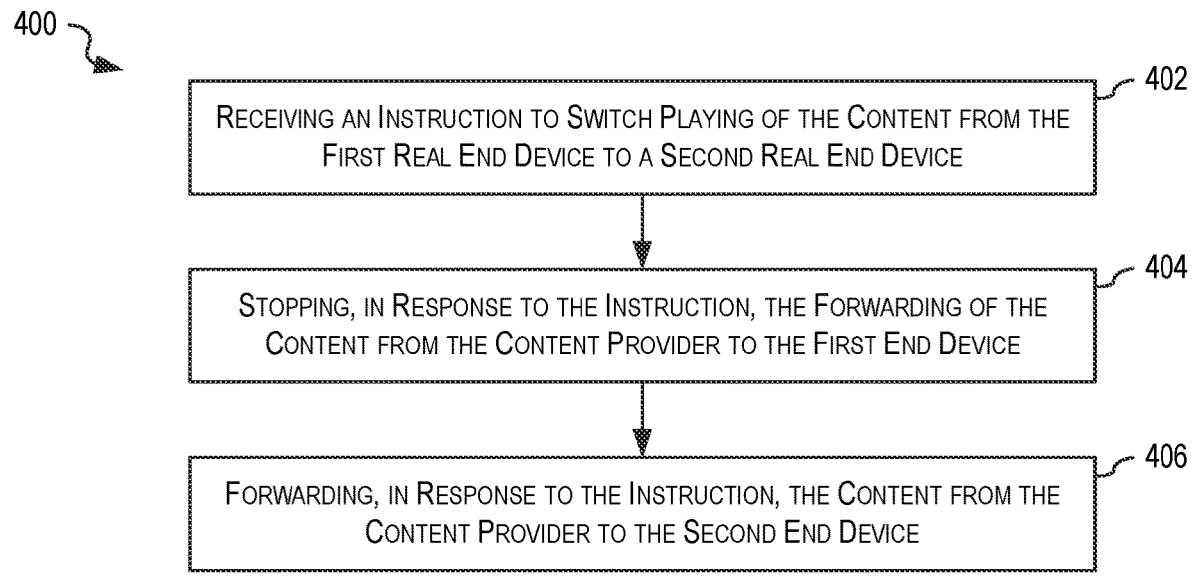
FIG. 4 is a flowchart illustrating one example method for switching playing of content of a current session from a first real end device to a second real end device, in embodiments.

FIG. 4 is a flowchart illustrating one example method 400 for switching playing of content of a current session from a first real end device to a second real end device. Method 400 is implemented in content session core 106 of application controller 104, for example. Method 400 may follow method 300, wherein content 132(1), received from content provider 130(1), is being forwarded by content session core 106(1) to real end device 160(1).

In block 402, method 400 receives an instruction to switch playing of the content from the first real end device to the second real end device. In one example of block 402, content session core 106(1) receives an instruction from the user interacting with control application 162(1) running on real end device 160(1), to switch playing of content 132(1) from real end device 160(1) to real end device 160(2). In block 404, method 400 stops, in response to the instruction, the forwarding of the content from the content provider to the first end device. In one example of block 404, content session core 106(1) stops forwarding packets of content 132(1) to real end device 160(1). In block 406, method 400 forwards, in response to the instruction, the content from the content provider to the second end device. In one example of block 406, content session core 106(1) starts forwarding packets of content 132(1) to real end device 160(2).

Figure 5:
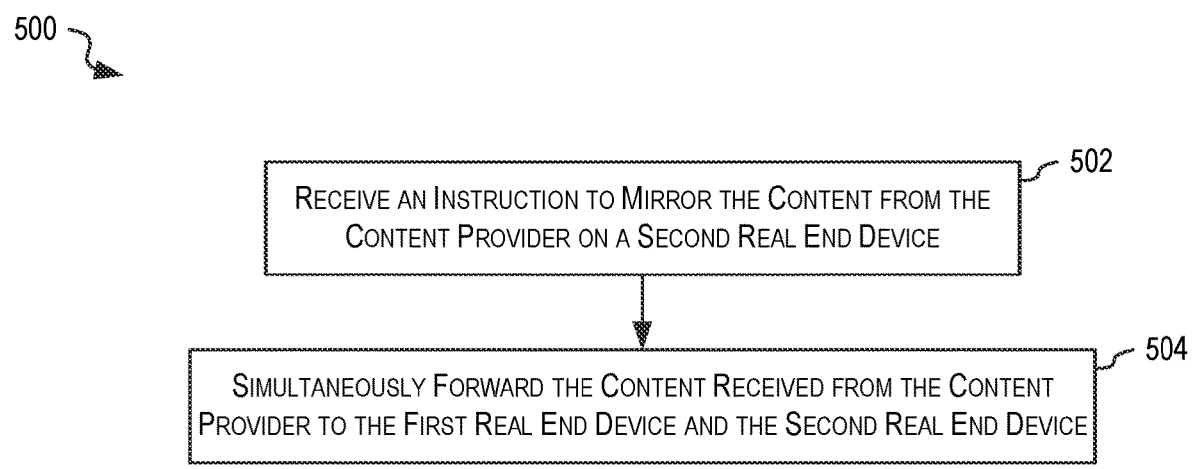
FIG. 5 is a flowchart illustrating one example method for mirroring content of a current session on both a first real end device and a second real end device, in embodiments.

FIG. 5 is a flowchart illustrating one example method 500 for mirroring content of a current session on both a first real end device and a second real end device. Method 500 is implemented in content session core 106 of application controller 104, for example. In the example of FIG. 5, content 132(2), received from content provider 130(2), is being forwarded by content session core 106(2) to real end device 160(3) (e.g., a first real end device).

In block 502, method 500 receives an instruction to mirror the content from the content provider on a second end device. In one example of block 502, content session core 106(2) receives an instruction from the user interacting with control application 162(3) running on real end device 160(3), to mirror playing of content 132(2) on real end device 160(4). In block 504, method 500 simultaneously forwards the content received from the content provider to both the first real end device and the second real end device. In one example of block 504, content session core 106(2) forwards packets of content 132(2) to both real end device 160(3) and real end device 160(4).

Examples of Operation

In one example of operation, a user is in their backyard one weekend and receives a VoIP call (e.g., from parents or friends located elsewhere). The VoIP call is received by one content session core 106 configured for communication with the VoIP server (e.g., being configured with the user's VoIP credentials). The content session core 106 "rings" all real end devices also having the same user credentials that are connected to AP 102, allowing the call to be answered an any of the connected devices.

In another example of operation, a user participates in a VoIP call using a smartphone while travelling from work to home. Upon reaching home, the smartphone connects to LAN 166, wherein content session core 106 configured with the same user credentials initiates a session with the VoIP server to continue the VoIP call via LAN 166 and WAN 136. Advantageously, the user may then interact with content session core 106 (e.g., using control application 162 running on the smartphone, or another real end device 160) to switch the VoIP call to another end device 160 (e.g., a smart television).

In another example of operation, a family wants to watch a movie. Dad is relaxing near an outdoor television beside the pool, mom is in the kitchen preparing a meal for the family, and the kids are with friends in the living room. Instead of three devices (pool television, kitchen television, and living room television) independently streaming the same movie from content provider 130, content session core 106 connects to content provider 130 to receive content 132 using a single session, and content session core 106 mirrors the content simultaneously on all three real end devices 160.

In another example of operation, a user is watching content from a content provider 130(1) on a first real end device 160(3) when first real end device 160(3) indicates a battery low condition, but unfortunately, the user does not have a charger handy. Advantageously, the user interacts with control application 162 to instruct content session core 106 to switch the session to another device that is not low on power, wherein content session core 106 switches playing of content 132 to real end device 160(4) without needing to close the current session, without losing the current location in the content 132, and without needed to create a new session.

Enhanced Wireless Mobility with AI

Where a wireless local-area network has a plurality of wireless access points (WAPs) distributed throughout a coverage area, each WAP may be accessible using the same login credentials, such that a mobile device may connect to any of the WAPs to access the WLAN. In the prior art, the mobile device determines when it moves away from a first WAP, to which it is currently connected, identify a second WAP that it may connect to next, then disconnect from the first WAP, and then connect to the second WAP to maintain its connect to the LAN.

Another aspect of the present embodiments includes the realization that when a mobile device moves from a first location served by a first wireless AP (WAP) to a second location served by a second WAP, the mobile device must actively determine that it cannot remain connected to the first WAP, find the second WAP, disconnect from the first WAP, and connect to the second WAP, to maintain connectivity to a local-area network (LAN). Such expected behavior is burdensome and non-optimal for the mobile device. The present embodiments solve this problem by providing a wireless local-area network controller (WLC) that uses artificial intelligence (AI) to predict movement of the mobile device and automatically control handoff connectivity of the mobile device from a first wireless AP to a second wireless AP to maintain network connectivity for the mobile device. Advantageously, the mobile device does not need to determine when to switch between wireless APs based upon a received signal strength and is automatically disconnect from the first wireless AP and connect to the second wireless AP.

Another aspect of the present embodiments includes the realization that, in response to moving away from a first wireless AP, selecting a second wireless AP based upon received signal strength does not result is the most optimal connection when the second wireless AP is overly congested. The present embodiments solve this problem by providing a wireless local-area network controller (WLC) that uses artificial intelligence to determine the second wireless AP based upon both the movement of the mobile device and the loading of wireless APs within range of the mobile device. Advantageously, a quality of network connectivity provided to the mobile device is improved by automatically selecting the most appropriate wireless AP for receiving the handover of the mobile device based upon predicted movement of the mobile device and workload of the wireless APs available for use by the mobile device.

Figure 6:
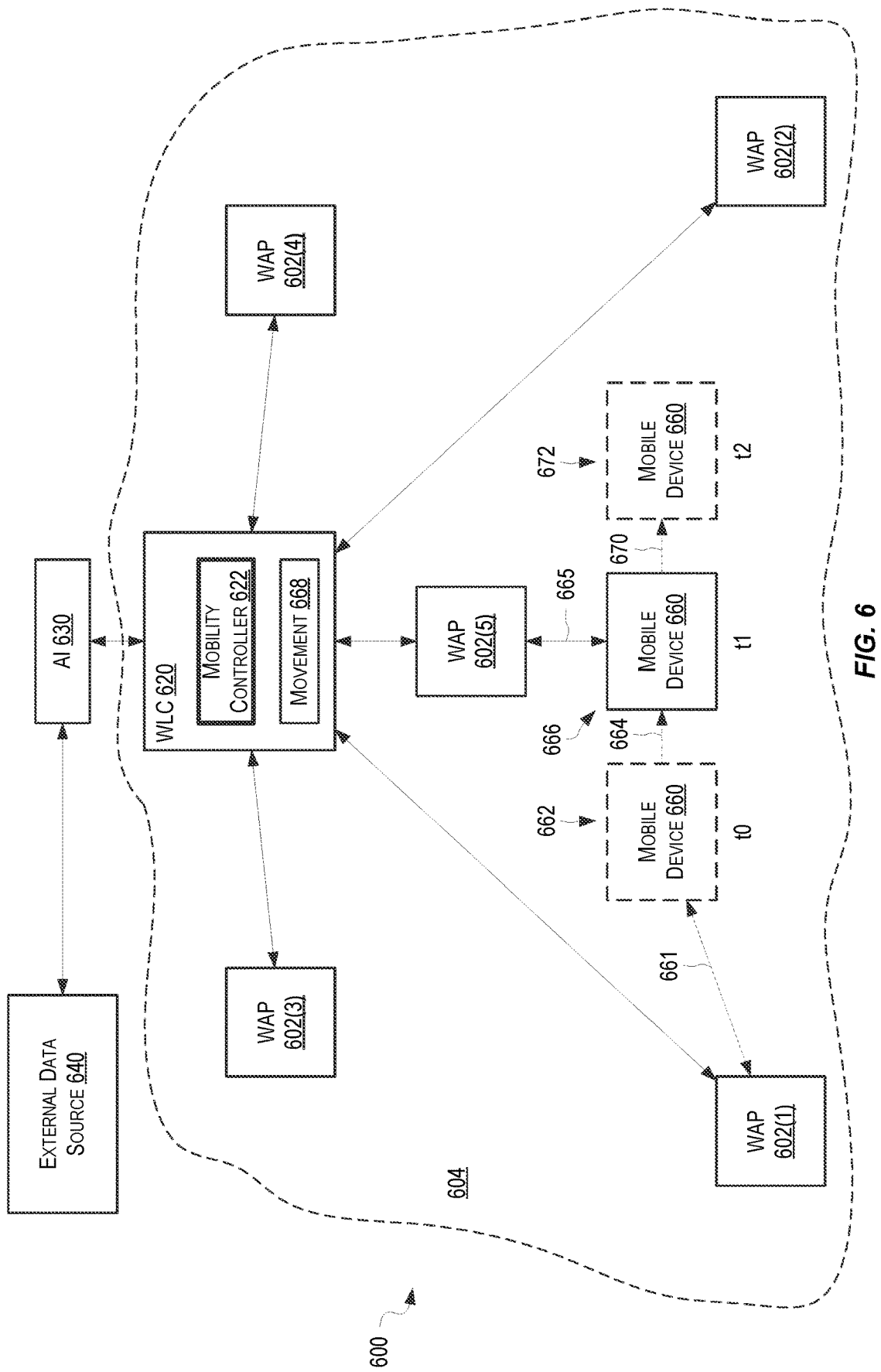
FIG. 6 is a functional diagram illustrating handoff of a mobile device moving through a geographic area that includes a LAN formed by a plurality of wireless access points (WAPs), in embodiments.

FIG. 6 is functional diagram illustrating handoff of a mobile device 660 moving through a geographic area 604 that includes a LAN 600 formed by a plurality of WAPs 602. WAPs 602 are each configured with login credentials of mobile device 660, such that mobile device 660 may connect with any WAP 602 to access LAN 600. WAPs 602 may implement a wireless protocol such as Wi-Fi (e.g., IEEE 802.11u), and area 604 may represent one or more of an office complex, a hotel, a town, a shopping mall, a station, an airport, and so on. WAPs 602 may communicatively couple with, and may be controlled by, a wireless LAN controller (WLC) 620 to implement LAN 600. WLC 620 operates to ensure WAPs 602 are correctly configured (e.g., by defining access credentials) for allowing access by mobile device 660.

In certain embodiments, WLC 620 is enhanced by including a mobility controller 622 that improves connectivity of mobile device 660 moving within area 604 by automatically handing off connectivity of mobile device 660 between WAPs 602 based upon a determined movement 668 (e.g., defined as at least two timestamped locations) of mobile device 660. Although mobility controller 622 is shown within WLC 620, mobility controller 622 may be implemented elsewhere, such as within one of WAPs 602, or within another device (e.g., a server) connected to LAN 600.

Figure 7:
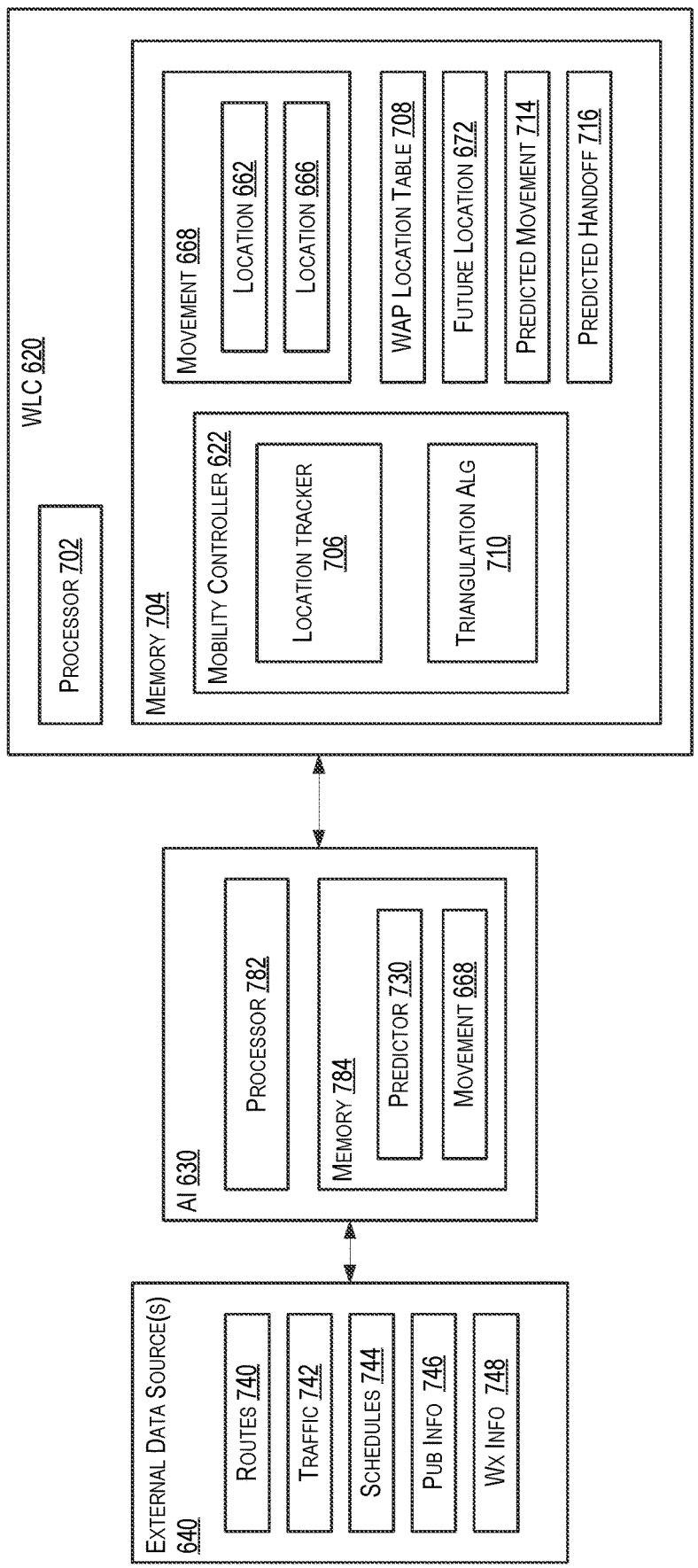
FIG. 7 is a functional block diagram illustrating the wireless LAN controller (WLC) of FIG. 6 in further example detail, in embodiments.

FIG. 7 is a functional block diagram illustrating WLC 620 of FIG. 6 in further example detail. WLC 620 may include a processor 702 communicatively coupled with a memory 704 that includes mobility controller 622 implemented as machine readable instructions that, when executed by processor 702, control WLC 620 to implement the functionality described herein. FIGS. 6 and 7 are best viewed together with the following description.

Within area 604, a location tracker 706 of mobility controller 622 determines locations of mobile device 660 using information from at least two (preferably at least three) WAPs 602. For example, at time t0, location tracker 706 may determine that mobile device 660 is at a first location 662. Location tracker 706 may receive signal strength information of a transmission from mobile device 660 (e.g., a transmission of network data) from both WAP 602(1) and WAP 602(3). For example, WAP 602(1) and WAP 602(3) may each timestamp their respectively signal strength information and send it to WLC 620. Location tracker 706 may use a triangulation algorithm 710 to determine first location 662 of mobile device 660 at time t0 based, at least in part, upon the signal strength information received from WAP 602(1) and WAP 602(3) and known geographic locations, defined within WAP location table 708, of WAP 602(1) and WAP 602(3). As mobile device 660 moves, as indicated by arrow 664, within area 604, at time t1, mobility controller 622 may determine that mobile device 660 is at a second location 666 (e.g., based upon signal strength information determined by WAP 602(2) and WAP 602(4) of another transmission by mobile device 660). In certain embodiments, mobility controller 622 may use more than one method of determining location of mobile device 660.

Mobility controller 622 determines movement 668 (e.g., a direction and speed) of mobile device 660 based upon locations 662 and 666, and, in the example of FIG. 6, may determine, based on movement 668, future location 672 of mobile device 660 at a future time, t2. In certain embodiments, mobility controller 622 uses linear extrapolation to determine future location 672 based upon movement 668. Mobility controller 622 may further determine, based on movement 668 and/or future location 672, that mobile device 660 will leave an operational range of WAP 602(1) and enter an operational range of WAP 602(5), and generate predicted handoff 716 defining that handoff between WAP 602(1) and WAP 602(5) should occur at a predicted time (e.g., a time that allows handoff of mobile device 660 to maximize the connectivity experience for mobile device 660. Accordingly, based upon predicted handoff 716, mobility controller 622 instructs WAP 602(1) to handoff connectivity (illustratively shown as arrow 661) of mobile device 660 to WAP 602(5) (connectivity is illustratively shown as arrow 665) at the predicted time. That is, based upon determined movement 668 of mobile device 660 and known locations (e.g., defined by WAP location table 708) of each WAP 602, mobility controller 622 is prepared (e.g., in advance of the handoff) to control handoff of mobile device 660 from WAPs 602(1) to 602(5). Mobility controller 622 may track multiple mobile devices and thereby generate many predicted handoffs 716 that control handoffs between WAPs 602 based upon the determined movement of the mobile devices.

In the example of FIG. 6, even though at location 666, mobile device 660 may remain in wireless range of WAP 602(1), mobility controller 622 generates predicted handoff 716 to control WAP 602(1) to handoff connectivity of mobile device 660 to WAP 602(5), since movement 668 indicates that mobile device 660 is moving in that direction. Thus, handoff may occur before mobile device 660 experiences connectivity issues due to operational range of WAP 602(1). Advantageously, mobile device 660 experiences improved connectivity while moving through area 604 without any burden/overhead of determining when, and with which WAP 602, handoff should be made. That is, mobility controller 622 intelligently, based upon determined movement 668 of mobile device 660, determines predicted handoffs 716 in advance, and then controls WAPs 602 to handoff mobile device 660 at the predicted time. Mobility controller 622 predicts future location 672 of mobile device 660, based upon movement 668, and determines predicted handoff 716 for handoff of mobile device 660 based upon the predicted future location 672.

Figure 8:
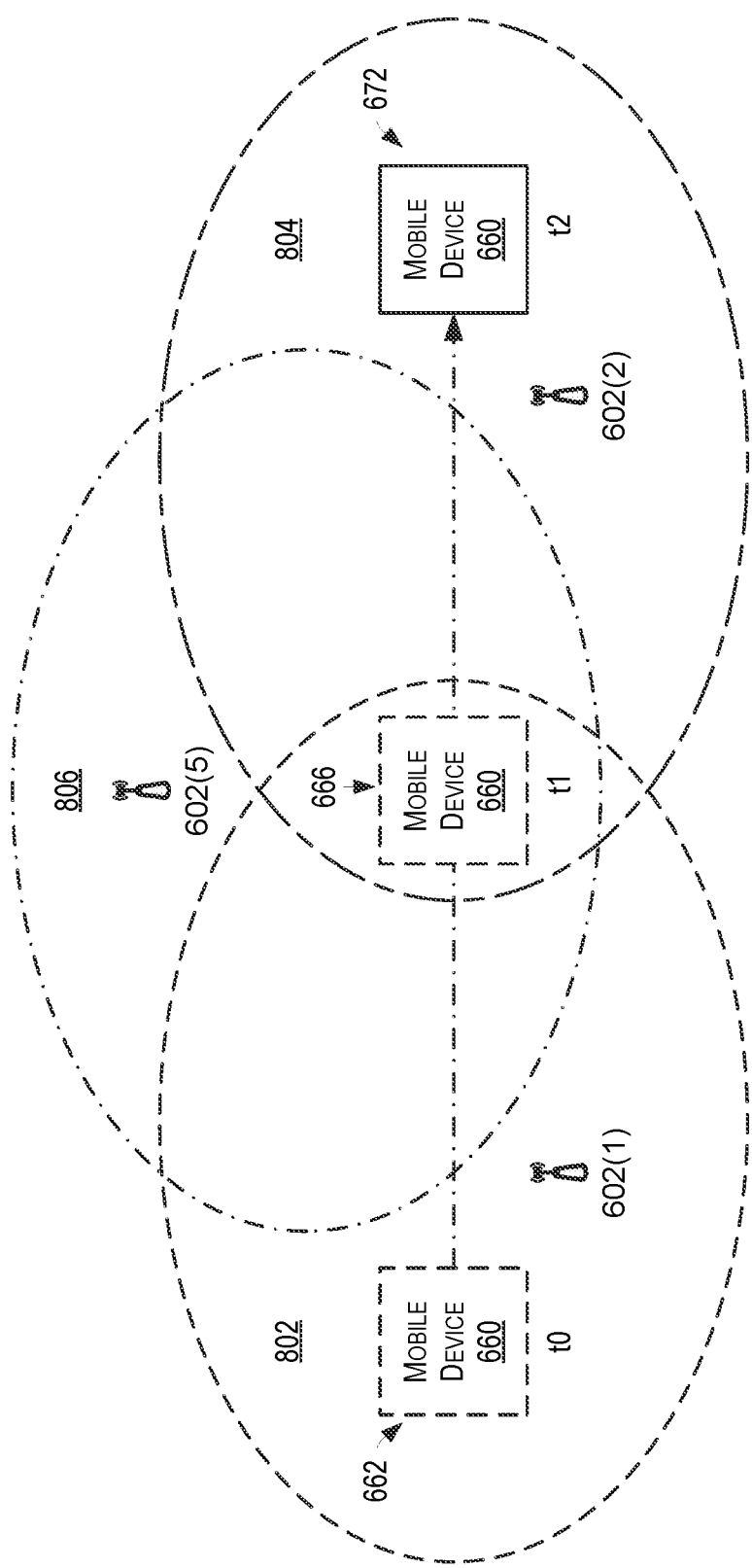
FIG. 8 is a schematic diagram illustrating example movement of the mobile device of FIG. 6 through operational areas of the WAPs of FIG. 6, in embodiments.

FIG. 8 is a schematic diagram illustrating example movement of mobile device 660 through operational areas 802, 804, and 806 of WAPs 602(1), 602(2), and 602(5), respectively, of FIG. 6. Continuing with the example of FIG. 6, mobile device 660 leaves location 662 at time t0 and reaches location 666 at time t1. However, instead of determining predicted handoff 716 of mobile device 660 from WAP 602(1) to WAP 602(5), mobility controller 622 generates predicted handoff 716 to control WAPs 602(1) to handoff mobile device 660 from WAP 602(1) to WAP 602(2), since a current speed of mobile device 660 (indicated by movement 668) shows that mobile device 660 is moving very quickly through operational area 806 of WAP 602(5), quickly requiring another handoff. Thus, intelligence of mobility controller 622 determines that it is better to handoff mobile device 660 from WAP 602(1) to WAP 602(2), even though, at time t1, WAP 602(5) is nearer to WAP 602(5). Advantageously, mobility controller 622 also uses speed of mobile device 660 to determine predicted handoff 716 for mobile device 660. Determining predicted handoff 716 may thereby take into account a time required for handoff of mobile device 660 between WAPs 602.

Mobility controller 622 may also take into account other factors when making such decisions. For example, mobility controller 622 may also determine that WAP 602(5) should be bypassed because operational areas 802 and 804 overlap sufficiently such that mobile device 660 does not lose connectivity with LAN 600. In another example, mobility controller 622 may determine that WAP 602(5) is congested (e.g., by one or more of (a) a number of connected devices and/or (b) current bandwidth usage of WAP 602), and thereby determines that handoff of mobile device 660 to WAP 602(5) would not be optimal since communication experienced by mobile device 660 would be inferior to a communication experience of mobile device 660 when connected to WAP 602(2).

In certain embodiments, mobility controller 622 may use artificial intelligence (AI) 630 to further improve prediction of movement and location of mobile device 660, and thereby further improve connectivity experienced by mobile device 660 within area 604. As shown in FIG. 6, AI 630 may be implemented remotely from WLC 620 (e.g., in a remote server and/or as a cloud service) that communicatively connects with WLC 620 and/or LAN 600. In other embodiments, AI 630 may be included within WLC 620, for example as part of mobility controller 622. AI 630 may include a processor 782 communicatively coupled with a memory 784 that stores a predictor 730 including machine readable instructions that, when executed by processor 782, implement functionality of AI 630 as described herein. In certain embodiments, predictor 730 may represent, include, or use a neural network for processing data and learning patterns in movement 668. In one example of operation, mobility controller 622 sends movement 668 (e.g., time tagged locations 662, 666) of mobile device 660 to AI 630, and predictor 730 may process movement 668 to generate and send a predicted movement 714 of mobile device 660 to mobility controller 622. In response, mobility controller 622 may preconfigure one or more WAPs 602 in preparation for handoff of mobile device 660.

In certain embodiments, AI 630 may also be communicatively coupled with at least one external data source 640 (e.g., one or more external databases maintained by third parties). External data source 640 may include current (e.g., the latest and most relevant) and future external (e.g., environmental, topical, contemporary) data relating to geographic area 604 such as routes 740 (e.g., transportation routes, such as bus routes, train routes, roads, cycle-paths, pedestrian paths, etc.), traffic 742 (e.g., current traffic conditions, congestions, accidents, news, etc.), schedules 744 (e.g., bus schedules, trains schedules, aircraft schedules, etc.), published information 746 (e.g., social media postings relating to the user of mobile device 660 and indicative of planned movements, events, trips, etc.), and weather information 748. Predictor 730 may then utilize one or more of routes 740, traffic 742, schedules 744, published information 746, and weather information 748, together with movement 668, to generate predicted movement 714 that may indicate future movement of mobile device 660 more accurately.

In one example of operation, location 662 corresponds to a bus stop within area 604 and predictor 730 determines that mobile device 660 is likely to board a next bus at the bus stop. Accordingly, predictor 730 generates predicted movement 714 of mobile device 660 based upon predicted movement (e.g., speed, direction, path) of the bus, taking into account a route of the bus (e.g., from routes 740), a schedule of the bus (e.g., from schedules 744), current traffic conditions along the route (e.g., from traffic 742), and weather conditions (e.g., weather information 748) along the route. In certain embodiments, predictor 730 may also detect patterns in movement 668, received from WLC 620 over time, and use the patterns to predict movement of mobile device 660. For example, where, each morning when travelling to work, the user of mobile device 660 regularly walks along a certain path to a coffee shop in area 604, predictor 730 may predict, when the current time correspond to the timing of the detected pattern, that mobile device 660 will follow the same path. Advantageously, mobility controller 622 may generate predicted handoff 716 based upon predicted movement 714, such that handoff of mobile device 660 between WAPs 602 provides an improved connectivity experience for mobile device 660 (and, therefore, for the user of mobile device 660). Further, since mobility controller 622 also factors in congestion within LAN 600, mobility controller 622 may also prevent exacerbation of such congestion through handoff of mobile device 660 to less busy WAPs 602.

Figure 9:
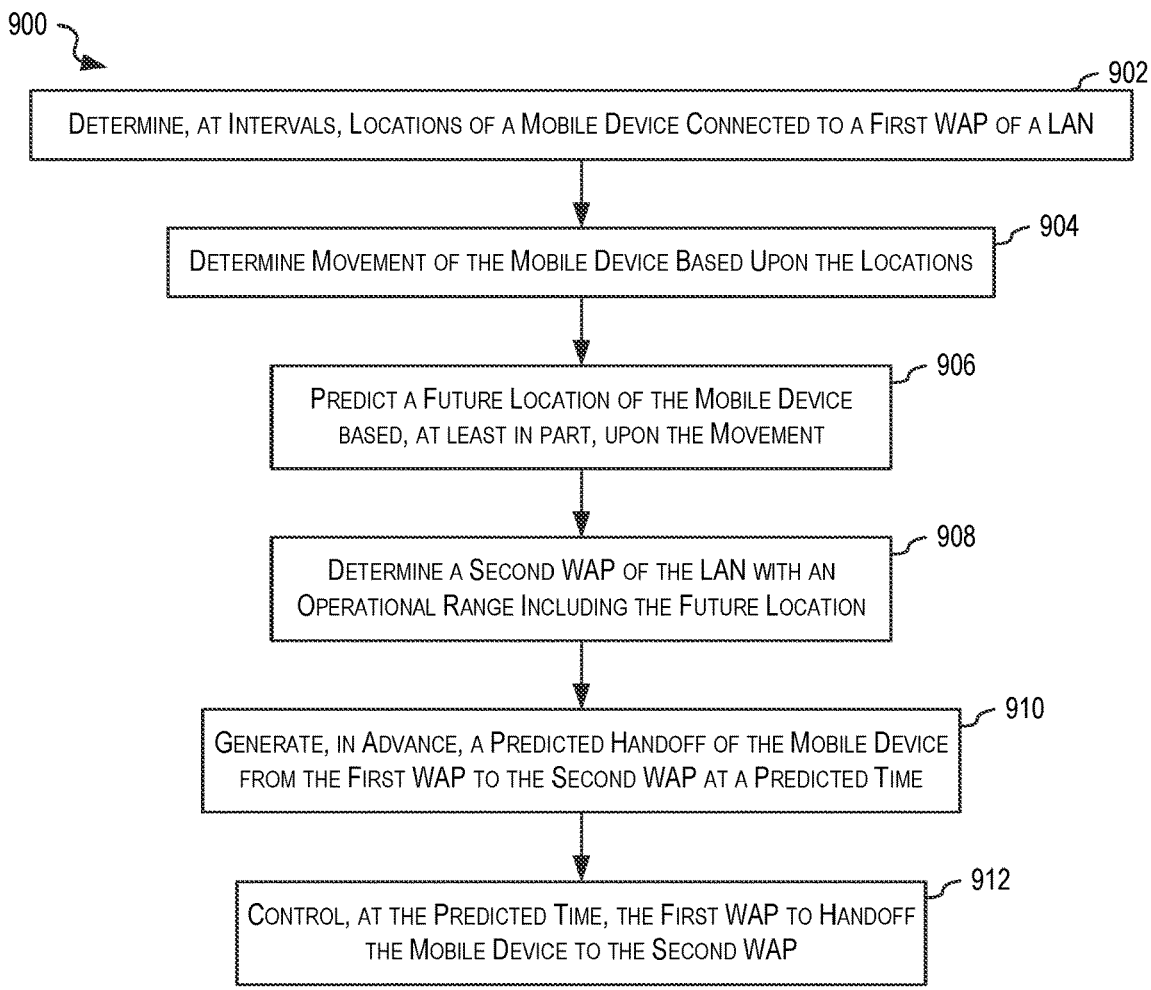
FIG. 9 is a flowchart illustrating one example method for handoff of the mobile device of FIG. 6 moving through the geographic area of FIG. 6 that includes a LAN formed by the plurality of WAPs 602.

FIG. 9 is a flowchart illustrating one example method 900 for handoff of a mobile device 660 moving through the geographic area 604 that includes a LAN 600 formed by the plurality of WAPs 602. Method 900 may be implemented in mobility controller 622 of WLC 620, for example. In block 902, method 900 determines, at intervals, locations of a mobile device connected to a first WAP of a LAN. In one example of block 902, mobility controller 622 determines, either periodically, or aperiodically, a location 662, 666, of mobile device 660 based upon triangulation of signal strength from at least two WAPs 602 of LAN 600. In block 904, method 900 determines movement of the mobile device based, at least in part, upon the locations. In one example of block 904, location tracker 706 generates movement 668 based upon location 662 and location 666, where movement 668 indicates one or both of speed and direction of mobile device 660. In block 906, method 900 predicts a future location of the mobile device based, at least in part, upon the movement. In one example of block 906, mobility controller 622 generates future location 672 of mobile device 660 based upon movement 668. In block 908, method 900 determines a second WAP of the LAN with an operational range including the future location. In one example of block 908, mobility controller 622 determines that WAP 602(2) has operational area 804 that includes future location 672, defined by future location 672. In block 910, method 900 generates, in advance, a predicted handoff of the mobile device from the first WAP to the second WAP. In one example of block 910, mobility controller 622 generates predicted handoff 716 to handoff mobile device 660 from WAP 602(1) to WAP 602(2). In block 912, method 900 controls, at the predicted time, the first WAP to handoff the mobile device to the second WAP. In one example of block 912, at the predicted time for, and based upon, predicted handoff 716, mobility controller 622 controls WAP 602(1) to handoff connectivity of mobile device 660 to WAP 602(2).

Figure 10:
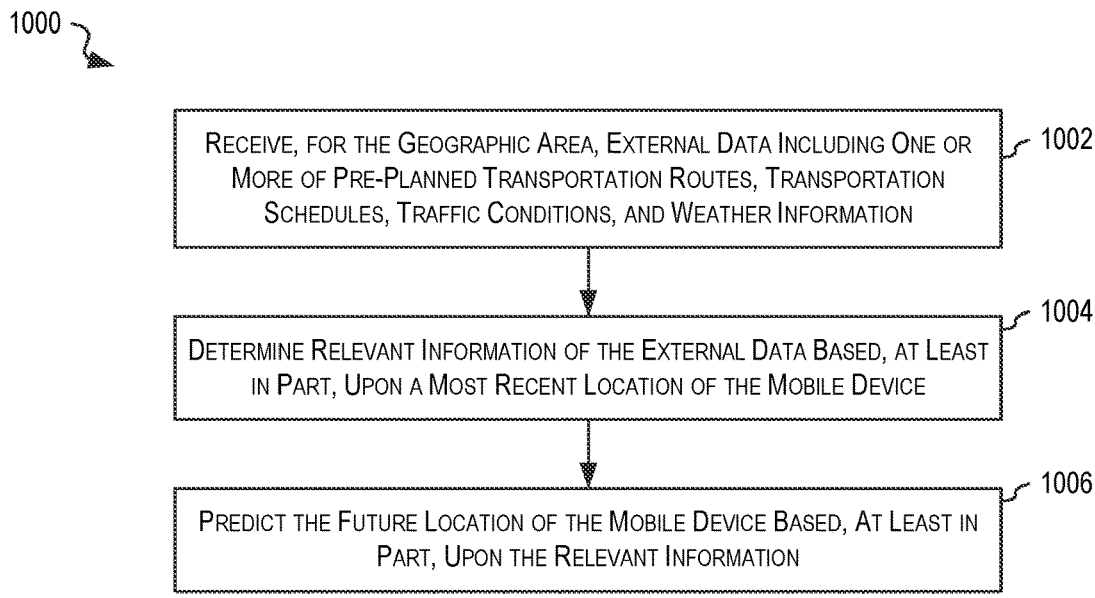
FIG. 10 is a flowchart illustrating one example method for predicting a future location of the mobile device of FIG. 6 based upon external data, in embodiments.

FIG. 10 is a flowchart illustrating one example method 1000 for predicting a future location of the mobile device based upon external data. Method 1000 may be implemented in predictor 730 of AI 630.

In block 1002, method 1000 receives, for the geographic area, external data including one or more of preplanned transportation routes, transportation schedules, traffic conditions, and weather information. In one example of block 1002, predictor 730 receives, in relation to geographic area 604, one or more of routes 740, traffic 742, schedules 744, and weather information 748 from external data sources 640. In block 1004, method 1000 determines relevant information of external data based, at least in part, upon a most recent location of the mobile device. In one example of block 1004, predictor 730 determines portions of routes 740, traffic 742, schedules 744, and weather information 748 that are relevant to mobile device 660 based upon a most recently determined location of mobile device 660. In block 1006, method 1000 predicts the future location of the mobile device based, at least in part, upon the relevant information. In one example of block 1006, mobility controller 622 determines future location 672 of mobile device 660 based upon predicted movement 714 (e.g., indicated by arrow 670) of mobile device 660 generated by predictor 730, where predictor 730 determines predicted movement 714 based upon a speed, direction, and path of a bus on which mobile device 660 is travelling, taking into account the route of the bus defined by routes 740, the schedule of the bus defined by schedules 744, traffic conditions, defined by traffic 742, along the route, and weather conditions, defined by weather information 748, along the route. Advantageously, the use of AI 630 improves the prediction of movement and future locations of mobile device 660.

No implementation changes are required within mobile device 660 or any of WAPs 602 to take advantage of the functionality added to WLC 620 by mobility controller 622 and, in certain embodiments, AI 630.

Further Examples of Operation

In one example of operation, a user of mobile device 660 regularly leaves home to travel to work and mobile device 660 connects to a WAP 602 in the community's parking lot. Predictor 730 identifies this movement pattern, and based upon current traffic information for the predicted route, predictor 730 determines which other WAPs 602 mobile device 660 may connect to and at what time, thereby configuring these WAPs 602 for handoff to mobile device 660 in advance.

In another example of operation, a user of mobile device 660 is sitting at a desk in an office and mobile device 660 is connected to one WAP 602 of LAN 600, which is an enterprise Wi-Fi. WAP location table 708 includes the location of each enterprise AP relative to an office floorplan. When mobile device 660 receives a notification of a meeting in 15 minutes at a particular conference room, predictor 730 may determine a route the user is likely to take to the conference room and thereby allow mobility controller 622 to generate predicted handoffs 716 for mobile device 660 in advance.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for enhanced handling of streamed content from a content provider, comprising:
receiving, at a content session core of an access point of a local area network, a first instruction to open a session with the content provider;
interacting, by the content session core, with the content provider to open the session between the content provider and the content session core using access credentials defining a username and a password for an account with the content provider;
allowing, via the content session core and the session, interaction between a first real end device and the content provider;
receiving, at the content session core via the session, the streamed content from the content provider;
forwarding the streamed content from the content session core to the first real end device;
receiving, at the content session core, a second instruction to mirror the streamed content from the content provider on a second end device; and
simultaneously forwarding, from the content session core, the streamed content received from the content provider to both the first real end device and the second end device.

2. The method of claim 1, further comprising receiving, at the content session core, a different instruction to switch playing of the streamed content from the first real end device to a different real end device.

3. The method of claim 2, wherein playing of the streamed content is switched from the first real end device to the second different real end device without the session between the content provider and the access point being disconnected.

4. The method of claim 2, further comprising interacting with an application running on the first real end device to receive the different instruction.

5. The method of claim 2, further comprising interacting with an application running on the second real end device to receive the different instruction.

6. The method of claim 2, further comprising stopping, in response to the different instruction, the forwarding of the streamed content from the content session core to the first real end device.

7. The method of claim 6, further comprising forwarding, in response to the different instruction, the streamed content from the content session core to the different real end device.

8. The method of claim 2, further comprising forwarding, in response to the different instruction, the streamed content from the content session core to the different real end device.

9. The method of claim 8, further comprising stopping, in response to the different instruction, the forwarding of the streamed content from the content session core to the first real end device.

10. The method of claim 2, further comprising one or both of (a) forwarding playing control from the first real end device to the different real end device and (b) retaining playing control at the first real end device.

11. The method of claim 10, the playing control comprising one or more of pause, rewind, fast forward, stop, and play.

12. The method of claim 1, further comprising emulating, within the access point, an end device from a perspective of the content provider.

13. The method of claim 1, further comprising interacting with an application running on the first real end device to receive the first instruction.

14. The method of claim 1, in response to receiving the second instruction, further comprising:
buffering at least part of the streamed content received from the content provider within the access point; and
forwarding the streamed content asynchronously to each of the first real end device and the second end device.

15. The method of claim 1, further comprising receiving a control signal from the first device and controlling the content on all other devices coupled to the content session core based on the control signal.

16. A software product comprising instructions, stored on non-transitory computer-readable media, wherein the instructions, when executed by an access point of a local area network, perform steps for enhanced handling of streamed content from a content provider within an access point, comprising:
instructions for receiving, at a content session core of the access point, a first instruction to open a session with the content provider;
instructions for interacting, by the content session core, with the content provider to open the session between the content provider and the content session core using access credentials defining a username and a password for an account with the content provider;
instructions for allowing, via the content session core and the session, interaction between a first real end device and the content provider;
instructions for receiving, at the content session core via the session, the streamed content from the content provider;
instructions for forwarding the streamed content from the content session core to the first real end device;
instructions for receiving, at the content session core, a second instruction to mirror the streamed content from the content provider on a second end device; and
instructions for simultaneously forwarding, from the content session core, the streamed content received from the content provider to both the first real end device and the second end device.

17. The software product of claim 16, further comprising:
instructions for receiving, at the content session core, a different instruction to switch playing of the streamed content from the first real end device to a different real end device;
instructions for stopping, in response to the different instruction, the forwarding of the streamed content from the content session core to the first real end device; and
instructions for forwarding, in response to the different instruction, the streamed content from the content session core to the different real end device.

18. The software product of claim 17, further comprising instructions for interacting with an application running on the first real end device to receive the different instruction.

19. The software product of claim 17, further comprising instructions for interacting with an application running on the different real end device to receive the different instruction.

20. The software product of claim 16, further comprising instructions for emulating, within the access point, an end device from a perspective of the content provider.

21. The software product of claim 16, further comprising:
instructions for buffering, in response to the second instruction, at least part of the streamed content received from the content provider within the access point; and
instructions for forwarding, in response to the second instruction, the streamed content asynchronously to each of the first real end device and the second end device.

\* \* \* \* \*